UNITED STATES PATENT OFFICE 2,385,934

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application June 8, 1942, Serial No. 446,288

8 Claims. (Cl. 260—78)

This invention relates to a new class of unsaturated esters possessing valuable properties as hereinafter described. They are the esters of (a) the half ester of carbonic acid and an unsaturated alcohol and (b) an hydroxy ester of a simple polyhydroxy compound and a simple hydroxy monocarboxylic acid.

By "ester-linkage" we mean a linking oxygen atom derived by interaction of a hydroxy group and an acid group. Thus, a carbonate R—O—CO—O—R contains two ester linkages.

By "simple polyhydroxy compound" we mean any organic compound having two or more hydroxyl groups which are not separated by an ester linkage. Thus, bis (ethylene glycol) carbonate is not a "simple polyhydroxy compound." Suitable simple polyhydroxy compounds are the glycols such as ethylene glycol, propylene glycol, trimethylene glycol, tetramethylene glycol, 1-3, dihydroxy butane, the dihydroxy pentanes, ricinoleyl alcohol, etc., the polyglycols such as di-, tri-, and tetraethylene glycol, di-, tri-, and tetrapropylene glycol, di-, tri-, and tetrabutylene glycols, etc., the aromatic polyhydroxy compounds such as resorcinol, pyrogallol, catechol, etc., or the higher polyhydroxy aliphatic compounds such as glycerol, alpha methyl glycerol, erythritol, pentaerythritol, dextrose, sucrose, etc.

By "simple hydroxy monocarboxylic acid" we mean a compound which contains at least one hydroxy group, and one carboxyl group. We do not, however, intend to include compounds which have an ester linkage within the molecule such as lactyl lactic acid

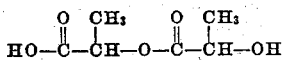

Suitable simple hydroxy monocarboxylic acids are glycolic, lactic, hydracrylic, α-hydroxybutyric, β-hydroxybutyric, salicylic, phloretic, melilotic, coumaric, vanillic, leucinic, valerolactinic, acetonic, ricinoleic, glyceric, gallic, saccharinic, divaric, protocatechuic, and the various resorcylic acids.

The new compounds are preferably the esters of unsaturated alcohols having up to five carbon atoms and an unsaturated linkage in an aliphatic chain such as allyl, methallyl, chloroallyl, crotyl, tiglyl, chlorocrotyl, ethylallyl, propargyl, and angelyl alcohols, methyl vinyl carbinol, ethyl vinyl carbinol, divinyl carbinol, dimethyl vinyl carbinol, etc. Esters of alcohols having six to ten carbon atoms are also useful such as geranyl, cinnamyl, phenylpropargyl, and β-propyl-allyl alcohols, and ethyl divinyl carbinol.

Many of the esters have the general structure:

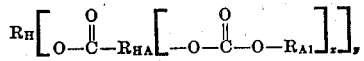

in which $R_H$ is the organic radical to which $y$ hydroxy groups of the simple polyhydroxy compound are attached. $R_{HA}$ is the organic radical to which $y$ carboxylic groups and $x$ hydroxy groups of the hydroxy carboxylic acid are attached and $R_{Al}$ is the radical derived from the unsaturated alcohol.

The new compounds may be regarded as the neutral esters of the glycerol triesters of hydroxy aliphatic acids and the unsaturated alcohol acid carbonate esters. Thus, they are the esters of compounds such as castor oil (glycerol triricinoleate), glycerol trilactate or glycerol trisalicylate with the carbonic acid half esters such as allyl acid carbonate or methallyl acid carbonate.

The new esters may be prepared by esterifying a simple polyhydroxy compound with one or more moles of simple hydroxy acid to form polyhydroxy esters such as ethylene glycol bis lactate, ethylene glycol mono lactate, ethylene glycol bis (α-hydroxy butyrate), ethylene glycol bis ricinoleate, etc., and the corresponding esters of propylene glycol, trimethylene glycol, glycerol, diethylene glycol, glycerol, etc. These hydroxy esters are prepared by heating the reactants on an oil bath to temperatures 100 to 150° C. and in the presence of an esterification catalyst such as phenol sulphonic acid or toluene sulphonic acid. The intermediate esters thus prepared are reacted with the chloroformates of unsaturated alcohols to prepare the new esters. The chloroformate is added to the hydroxy compound while maintaining the temperature between 0 and 20° C. The reaction is conducted in the presence of an alkaline reagent such as pyridine or other cyclic tertiary amine or the oxide, hydroxide, or carbonate of an alkali or alkaline earth metal. When an hydroxide or carbonate of an alkaline earth metal such as calcium carbonate is used as the alkaline agent, higher reaction temperatures are desirable to promote a practicable rate of reaction. When very strong alkaline reagents such as sodium or potassium hydroxide are used, it is frequently desirable to reverse the order of combining the reagents and add the alkaline agent to a mixture of the hydroxy compound and the chloroformate in order to avoid hydrolysis of the ester. The esterification reactions may be conducted in the presence of an inert solvent such as benzene, toluene, diethyl ether, carbon tetrachloride, petroleum ether, etc., for the purpose of maintaining a liquid phase reaction or to dilute the reactive mixture.

The same compounds may be synthesized by treating said intermediate ester such as diethylene glycol bis lactate, glycerol bis lactate, glycerol tris lactate, propylene glycol monolactate and the corresponding esters of glycolic, salicylic, ricinoleic, etc., acids with phosgene to prepare the chloroformates which may then be reacted with an unsaturated alcohol. The chloroformates are prepared by treating the polyhydroxy esters with phosgene at temperatures between 0° C. and 20° C. in a neutral or acid solution. The chloroformates are then added slowly to a mixture of unsaturated alcohol and an alkaline agent such as pyridine, NaOH, $CaCO_3$, etc., while maintaining the temperature between 0° C. and 20° C. by means of an ice bath and a stirrer to avoid local overheating. It is usually desirable to operate in a liquid medium. Accordingly, it is frequently necessary to add a suitable solvent such as benzene, diethyl ether, acetone, petroleum etther, toluene, or carbon tetrachloride.

The new unsaturated carbonates are generally non-resinous compounds having distinct boiling and melting points and are often capable of separation in substantially pure state. Frequently, the impurities are side reaction products which are colorless and transparent esters having characteristics similar to the esters herein contemplated. In such cases removal of said impurities may be unnecessary where they do not produce any detrimental effect in the use to which the ester is put. The new compounds are usually liquids at room temperature but some, however, are solids. The new unsaturated compounds are usually miscible with solvents such as benzene, toluene, chloroform, diethyl ether, carbon tetrachloride, and petroleum ether. The monomeric esters are valuable as plasticizers for various resin materials such as styrene, cellulose, vinyl, urea, protein, phenolic, or acrylic resins. Other uses such as solvents, insecticides, and liquid coating compositions are noteworthy.

These esters may be polymerized in the presence of heat, light, or catalysts such as oxygen, ozones, or organic peroxides such as lauroyl, benzoyl, and acetone peroxides, to yield solid or liquid compositions of widely differing physical properties. The polymerized products vary in properties depending upon the structure of the ester and upon the degree of polymerization.

Compounds having a single unsaturated group are polymerizable into readily thermoplastic materials capable of uses to which the common vinyl polymers such as vinyl acetate, etc., are usually put. A preferred group of new compounds are those which contain two or more unsaturated groups and especially those which are completely esterified (i. e.) containing no unreacted acid and hydroxyl groups. These polyunsaturated esters are capable of polymerization to a fusible intermediate stage and finally to a substantially infusible and insoluble polymer. The ultimate polymers of these new compounds are generally unaffected by acids, alkalies, water, and organic solvents. The polymers thus obtained are usually colorless and transparent although in some cases they may be slightly yellow when polymerized completely. Many of these polymers are tougher and more resistant to shattering than are the unsaturated alcohol diesters of simple polybasic acids.

Upon the initial polymerization of the polyunsaturated esters in liquid monomeric state or in a solution of the monomer in suitable solvents, an increase in the viscosity of the liquids is noticeable due to the formation of a relatively low molecular weight polymer which is soluble in the monomer, and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers of the polyunsaturated esters may be cast polymerized directly to the substantially insoluble, infusible state. This procedure is subject to certain inherent difficulties due to the strains which are established during polymerization of the gel and which frequently result in fractures as the final hard form is attained. It has been discovered that these difficulties may be avoided by releasing the strains established in the gel before the fracturing can occur. This may be done by permitting the strains to be relieved before the polymerization is complete, either periodically or by conducting the polymerization under conditions which permit gradual release of these strains. For example, the polymerization may be conducted in a simple mold until a soft firm gel has formed. At this point the polymer may be freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. The temperature is dependent upon the catalyst used. For benzoyl peroxide, temperatures of 65 to 80° C. are suitable, while for acetone peroxide, temperatures of 140–150° C. may be used. In accordance with one modification, the gel, after it is freed from the mold, may be coated on both sides with monomer or the syrupy polymer. The coated article is then polymerized between smooth heated plates to the final insoluble state.

Cast polymers may also be prepared by a single step polymerization directly to the insoluble infusible state. The monomer may be mixed with up to five percent of benzoyl or other organic peroxide and heated at 50 to 60° C. until it becomes partly polymerized and thickened to an increased viscosity of 100 to 1000 percent of the monomer viscosity. The thickened monomer may then be polymerized between glass, metal, or similar plates which are separated by compressible gaskets or retainers of Koroseal, butadiene polymers, polyvinyl alcohol, Thiokol, rubber, or similar materials arranged about the edge of such plates. The thickened monomer may be poured on one glass plate within the confines of the flexible retainer, laid about two inches from the edge of the plate. The second glass plate may then be carefully laid on top, taking care to avoid the trapping of air bubbles under the top plate.

When the top plate is in position, both plates may be held together by means of suitable clamps which are capable of applying pressure upon the plates directly over the flexible retainer. The entire assembly is then placed in an oven and heated at 70 to 100° C. where the polymerization is continued. During the polymerization the resin shrinks and tends to draw away from the glass surface. To prevent fractures pressure is maintained upon the plates to depress the flexible container and permit the plates to remain in contact with the polymerizing resin. This pressure may be maintained by periodically tightening the clamps or by use of spring clamps which maintains a uniform pressure throughout the polymerization process.

By an alternative procedure, for cast polymerizing sheets, the molds may be assembled before the thickened monomer is poured. Thus, the flexible compressible retainer may be inserted between the plates and held in place by suitable clamps located around the edge of the plates. This retainer or gasket is placed adjacent the edge of the plates and a suitable opening provided between the ends of the flexible retainer, preferably at one corner of the mold. The assembled mold is then placed in a vertical position with the open corner uppermost. The thickened monomer which may contain up to four percent residual peroxide is then poured in slowly until the entire mold is filled. After standing until all of the entrapped air has separated, the mold is heated uniformly between 50 and 100° C., to continue the polymerization. Pressure is maintained upon the plates to ensure the contact of glass and resin during polymerizable by suitable means, such as by tightening the clamps periodically or by maintaining a uniform pressure upon the plates throughout by means of spring clamps. When the resin has been completely polymerized it is separated from the glass plates and a hard, transparent, colorless, and durable resin sheet is obtained.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, by removal from exposure to ultraviolet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers of the new esters are produced by heating the monomer or a solution thereof in the presence of substantial quantities, for example, 2 to 5 percent of benzoyl peroxide until the viscosity of the solution has increased about 100 to 500 percent. This may require several hours while heating at 65 to 85° C. in the presence of benzoyl peroxide. The resulting viscous solution is poured into an equal volume of water, methyl or ethyl alcohols, glycol or other non-solvent for the fusible polymer. A polymer, usually in the form of a powder or a gummy precipitate is thus formed which may be decanted or filtered and then dried. This permits substantially complete separation of a soluble fusible polymer from unpolymerized monomer.

Often, however, a complete separation of monomer and polymer is not desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain polymer and from about 5 percent to 50 or 60 percent monomer. Preferably, the production of these materials is conducted by treatment of a solution of the monomer in a solvent for monomer and polymer, such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility, they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, etc., and then polymerizing to the point where the gel precipitates. This polymer may be separated and used as molding powder.

The solid forms of the fusible polymers may be used as molding compositions to form desirable molded products which may be subsequently polymerized to an infusible state. Preferably, the molding is conducted in a manner such that the polymer fuses or blends together to form a substantially homogeneous product before the composition is polymerized to the substantially infusible state. This may be effected by conducting polymerization at an elevated temperature and/or pressure in the presence of benzoyl peroxide, generally in a heated mold. The polymers may be mixed with fillers such as alpha cellulose, wood pulp, and other fibrous substances, mineral fillers or pigments such as zinc oxide, calcium carbonate, lead chromate, magnesium carbonate, calcium silicate, etc.; plasticizers such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl Cellosolve, dichlorethyl ether, dibutyl phthalate, or mixtures thereof, is useful as a liquid coating composition. Objects of paper, metal, cloth, wood, leather, or synthetic resins may be coated with the solution of polymer in solvent and subsequently polymerized to yield attractively finished coatings. Similarly, porous objects of felt, cloth, leather, paper, etc., either in single layers or laminated, may be impregnated with the dissolved fusible polymer and subjected to the polymerization to the final infusible insoluble state. Other molding powders may be prepared from the new esters without first converting them to the intermediate polymer. The monomer may be mixed directly with a suitable filler such as magnesium carbonate, cellulose pulp, asbestos, etc., in a ball mill or other mixing device. By proper selection of proportions, a dry pulverulent powder can be obtained which is capable of polymerization under the influence of heat and pressure to a glossy solid polymer of high tensile strength. The use of too much filler will cause a non-glossy finish and the use of too much monomer will make the powder moist and difficult to handle. Sometimes it may be desirable to precure the molding powder by subjecting it to a moderate temperature of 50 to 70° C. for a limited period of time, for example, one to three hours, and this precuring operation is a partial polymerization and permits a dry molding powder where the same proportions of monomer might result in a moist molding composition.

The following examples are illustrative:

Example I

Glycerol (95 grams) and three molar equivalents of lactic acid (280 grams) were heated on a water bath for 18 hours in the presence of 1.1 grams p-toluenesulphonic acid to catalyze the reaction. A mixture of the monolactate and dilactate of glycerol was formed. The esters were mixed with 1000 cc. benzene and 275 grams of pyridine, and cooled to +2° C. 375 grams of allyl chloroformate were added slowly to prevent the heating of the reaction mixture to a point above 15° C. The benzene solution of the carbonate esters was washed with sodium carbonate solution, with hydrochloric acid, and with water until neutral. After drying over calcium chloride, the solution was heated at 75 to 80° C. to evaporate the benzene, a viscous liquid ester being secured.

The ester mixture was heated at 75° C. in the presence of 3 percent benzoyl peroxide. A hard solid polymer was obtained.

Example II

One kilogram of castor oil was mixed with 2000 cc. benzol and 250 grams pyridine. It was cooled to +2° C. on an ice bath. With continuous stirring to dissipate the heat of reaction, 360 grams of allyl chloroformate was slowly added at the rate of 5 grams per minute for 15 minutes. The rate of addition was then increased to 10 grams for the next 15 minutes. The balance was then added at 18 to 25 grams per minute. When the addition was completed the mixture was maintained at the reaction temperature of +2 to +5° C. for an hour with uninterrupted stirring. The benzene solution was washed with dilute hydrochloric acid and with water until neutral. The ester was freed of benzene and the more volatile impurities by heating at 100° C. under 25 mm. pressure. The index of refraction of the new material was found to be 1.4752 and the product was soluble in petroleum ether, a non-solvent for castor oil. It thickened and finally became a gel when heated at 75° C. with 5 percent of benzoyl peroxide.

Example III

Sixty-five grams of ethylene glycol, 225 grams of salicylic acid, 15 grams of anhydrous aluminum sulfate, and 1000 cc. of benzene were refluxed for three hours. The vapors were condensed and the benzene separated from the water and returned to the reaction by a continuous apparatus. After the evolution of water ceased, the benzene solution was washed with two 50 cc. portions of saturated sodium sulphate solution and dried over anhydrous sodium sulphate. The solution of ethylene disalicylate was cooled to +2° C. and mixed with 165 grams of pyridine. 250 grams of methallyl chloroformate were added at a rate which enabled the dissipation of heat of reaction and the maintenance of the reaction temperature below 10° C. When the reaction was complete the excess pyridine was neutralized with HCl and the benzene solution washed with water. The benzene and other volatile impurities were evaporated by heating at 50–60 mm. total pressure. The ester formed is a liquid believed to have the following structure:

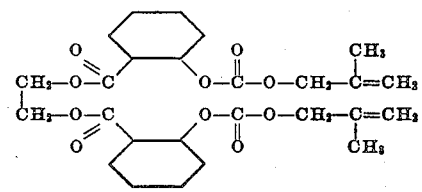

Example IV

Ethylene glycol (90 grams) was esterified with two gram molar equivalents of lactic acid (250 grams) in the presence of 2 grams of anhydrous aluminum sulfate and 1000 cc. of benzene. The esterification was performed by refluxing for two hours with a continuous separatory condenser for removing the water of reaction. When the reaction was substantially complete the benzene solution of glycol dilactate was cooled to 0° C. and mixed with 350 grams of allyl chloroformate. A 200 cc. quantity of 50 percent sodium hydroxide was added dropwise at a rate of two to three cubic centimeters per minute. After 50 cc. were added the rate was increased to about 4 to 5 cc. At the end of the addition this rate had been increased 6 to 8 cc. per minute. This slow but progressively increasing rate of addition enabled the maintenance of temperature between +2 and +8° C. The ester solution was washed with dilute hydrochloric acid, with water until neutral, and then dried with calcium chloride. The ester was purified by evaporating the benzene and other volatile impurities. The ester was a colorless liquid having the following structural formula:

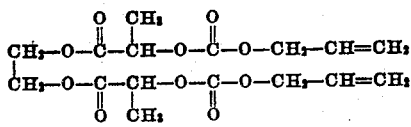

A ten gram sample was heated at 70° C. with 5 percent benzoyl peroxide. After one hour a hard, transparent solid was formed.

*Example V*

Propylene-1,2-diglycolate was prepared in benzene solution by esterification of 160 grams of glycolic acid and 110 grams of 1,2-propylene glycol. The reaction was conducted in the presence of 1200 cc. of benzene and 1.5 grams of anhydrous aluminum sulfate by heating the mixture at the reflux temperature. The condensate was separated into the two liquid phases and the benzene returned to the esterification vessel. As soon as the reaction ceased to evolve water the mixture was cooled to 0° C. and mixed with 200 grams of pyridine. While maintaining the temperature between 0° C. and 12° C. by cooling, stirring, and regulating the rate of addition of reactants, an excess of crotyl chloroformate was added. The benzene solution was thereafter washed with dilute hydrochloric acid and with water until neutral to phenolphthalein. After drying over anhydrous $Na_2SO_4$ the benzene was vaporized and a clear, colorless liquid ester was obtained. The ester was believed to have the following structure:

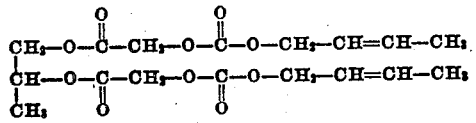

*Example VI*

Diethylene glycol (106 grams) and α-hydroxy butyric acid (208 grams) were mixed with 1500 cc. benzene and 2.5 grams of anhydrous aluminum sulfate. The mixture was heated four hours at the reflux temperature. The vapors were condensed and intermittently the benzene was separated from the water and returned to the reaction vessel. At the end of four hours no more water was being evolved. The benzene solution was washed with 100 cc. of water and dried with anhydrous $Na_2SO_4$. The diethylene glycol bis (α-hydroxy butyrate) was mixed with 185 grams pyridine and treated with 250 grams of allyl chloroformate as described in Example IV. During the reaction the temperature was maintained between +4 and +16° C. The benzene solution was washed with dilute acid to remove the pyridine and pyridine hydrochloride and with water. The solution was dried over anhydrous sodium sulfate. The diethylene glycol bis α-oxy(carballyloxy)butyrate was freed of benzene by heating at 8-10 mm. total pressure. The ester was a colorless liquid having the probable formula:

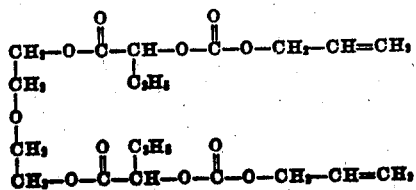

*Example VII*

A fifty gram sample of the monomeric ester described in Example IV was dissolved in 300 cc. of benzene. Two grams of benzoyl peroxide were added and the solution heated for three hours at 65° C. The solution increased in viscosity to about 300 percent. of the monomeric viscosity. The viscous liquid was then poured into 500 cc. of methyl alcohol causing a separation of a solid precipitate. The solid was separated by decantation and washed with methyl alcohol. After drying a granular resinous solid was obtained. A ten gram sample was heated to 135° C. in a mold under 1500 lbs. per square inch pressure for about one hour. A hard, tough polymer was secured.

This application is a continuation-in-part of Serial No. 361,280, filed October 15, 1940, and Serial No. 403,703, filed July 23, 1941, by Irving E. Muskat and Franklin Strain.

Although the invention is described with respect to certain specific examples, it is not intended that the details described shall be limitations upon the scope of the invention except as expressly included in the appended claims.

We claim:

1. A neutral ester of one molecular equivalent of castor oil and three molecular equivalents of of allyl acid carbonate.

2. A neutral ester of one molecular equivalent of glycerol trilactate and three molecular equivalents of methallyl acid carbonate.

3. A neutral ester of one molecular equivalent of glycerol trisalicylate and three molecular equivalents of the carbonic acid half ester of allyl alcohol.

4. A polymer of the compound defined in claim 1.

5. A polymer of the compound defined in claim 2.

6. A polymer of the compound defined in claim 3.

7. As a new compound an ester having the molecular structure:

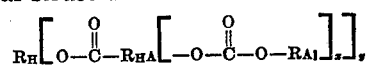

wherein $R_H$ is a saturated hydrocarbon radical having a valence $y$, $R_{HA}$ is a hydrocarbon radical having a valence equal to $(x+1)$, $R_{Al}$ is an alkenyl radical having at least three carbon atoms and having an unsaturated carbon to carbon bond between the second and third carbon atoms from the oxygen atom adjacent to said alkenyl radical, $x$ is a small whole number and $y$ is a small whole number greater than one.

8. As a new compound an ester having the molecular structure:

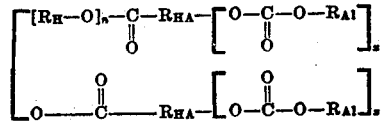

wherein $R_H$ is a divalent saturated aliphatic radical, $R_{HA}$ is an hydrocarbon radical having a valence equal to $(x+1)$, $R_{Al}$ is an alkenyl radical having at least three carbon atoms and having an unsaturated carbon to carbon bond between the second and third carbon atoms from the oxygen atom adjacent to said alkenyl radical, and $x$ and $n$ are small whole numbers.

IRVING E. MUSKAT.
FRANKLIN STRAIN.